March 31, 1936.    N. D. STURGES    2,035,995
STORAGE BATTERY
Filed April 22, 1935
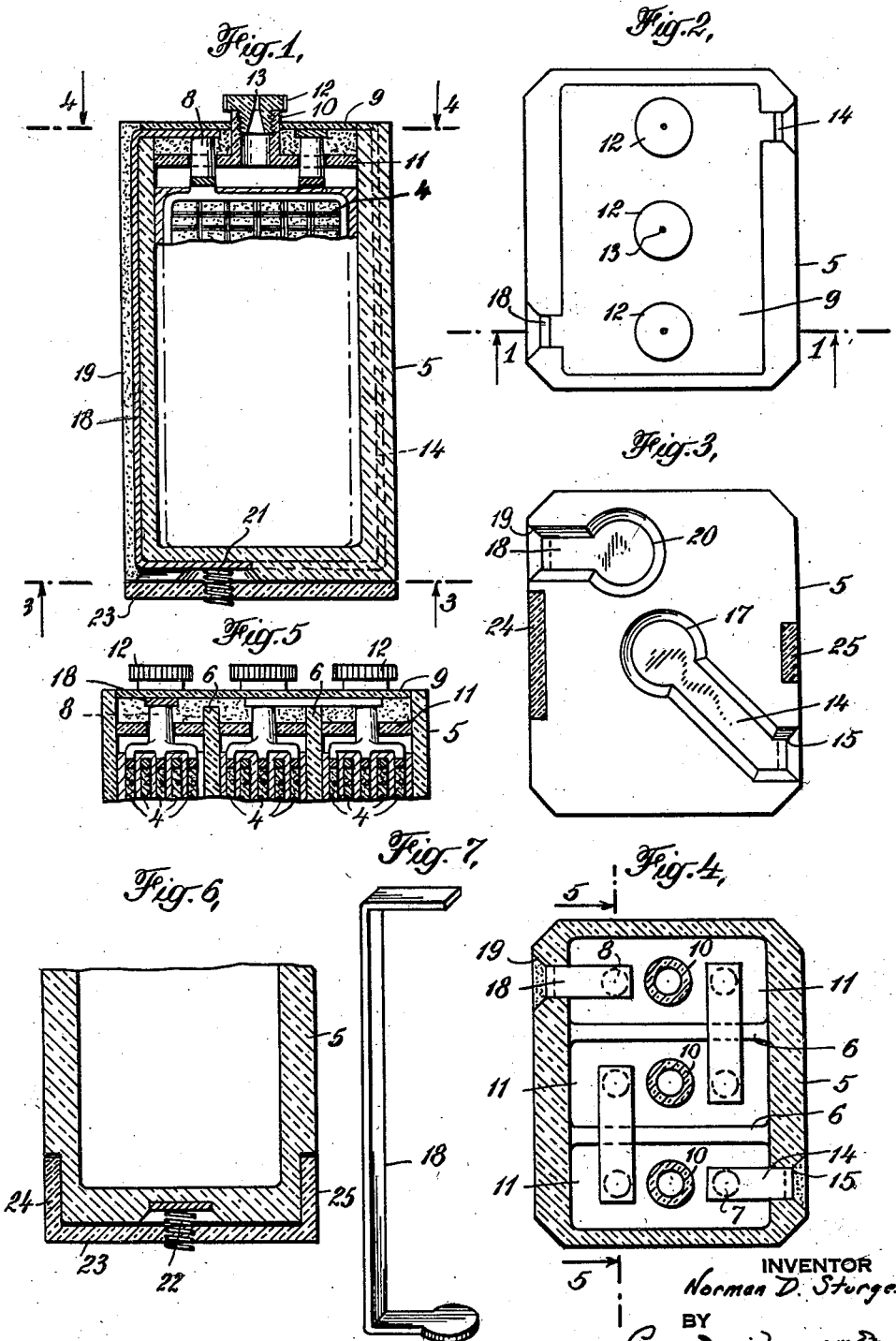
INVENTOR
Norman D. Sturges
BY
ATTORNEYS Patented Mar. 31, 1936

2,035,995

UNITED STATES PATENT OFFICE 2,035,995

STORAGE BATTERY

Norman D. Sturges, New York, N. Y., assignor to Sturges Battery Corporation, New York, N. Y., a corporation of New York Application April 22, 1935, Serial No. 17,599

1 Claim. (Cl. 136—166)

This invention relates to storage batteries and particularly to portable batteries designed for interchangeable use in suitable supports such, for example, as electric lanterns and the like.

Storage batteries as ordinarily constructed consist of one or more cells, each including a plurality of positive and negative plates, the plates of same polarity being connected by straps which are in turn connected to the battery terminals at the top of the battery casing. Filling openings with gas vents are likewise provided at the top of the casing to permit the introduction of electrolyte or water and the escape of gases evolved. The plates of a storage battery usually consist of lead grids with active material such as lead oxides pasted thereon. The electrolyte is usually a water solution of sulphuric acid.

In my U. S. Patent No. 1,905,319, I have described an improvement in storage batteries involving the utilization of an absorbent material for the electrolyte interposed between and surrounding the plates of the battery. The use of this improvement facilitates the application of storage batteries for many purposes to which they are not otherwise well adapted, because the danger of spilling the electrolyte is obviated. However, the ordinary storage battery structure, involving the use of terminal posts at the top of the casing, is not well adapted for portable application of the storage battery. It involves the necessity for complicated connections and the danger of short-circuiting the battery in use.

It is the object of the present invention to afford a simple and practical storage battery with terminals at the bottom of the battery adapted to readily connect with conductors in the desired circuit, the battery having, however, filling openings and gas vents at the top of the casing as in the usual battery structure. The invention is particularly adapted for application in connection with the patented improvement hereinbefore mentioned. It may be utilized also, however, in batteries containing no absorbent material.

The structure of and the material employed in the battery plates may be those commonly used in storage batteries and, for example, those illustrated and described in my aforesaid Patent No. 1,905,319. Such details are well known and are not consequently described herein. The present invention involves more particularly the casing in which the active battery elements are housed.

The invention will be better understood by reference to the following specification and the accompanying drawing, in which Fig. 1 is a vertical section on the line 1—1 of Fig. 2;
Fig. 2 is a plan view of the battery;
Fig. 3 is a section on the line 3—3 of Fig. 1;
Fig. 4 is a section on the line 4—4 of Fig. 1;
Fig. 5 is a detail in section on the line 5—5 of Fig. 4;
Fig. 6 is a detail in section of the separable cover; and
Fig. 7 is a perspective view of one of the straps.

Referring to the drawing, 5 indicates a casing of hard rubber or other suitable acid resistant material which, for convenience, is illustrated as divided into three cells by partitions 6. It will be understood that any number of cells may be employed, depending upon the desired voltage of the battery. Each of the cells encloses a plurality of positive and negative plates 4, all of the positive plates being connected to a terminal 7 and all of the negative plates being connected to a terminal 8 in the usual manner. The terminals 7 and 8 are not, however, exposed, and are covered by a plate of insulating material 9 which surrounds the projecting filling openings 10, each of which is normally closed by a cap 12 having a vent 13 to permit the escape of the gases evolved by the operation of the battery. It will be understood that the top of the casing is sealed effectively by the use of a suitable sealing compound, which may be introduced beneath the plate 9 and about the edges thereof, above the cell covers 11, so that the electrolyte cannot seep from the battery casing.

The positive terminal 7 is connected by a strap 14 carried in a groove 15 in the vertical wall of the battery casing to a terminal 17 disposed in a recess in the bottom of the battery. Similarly the negative terminal 8 is connected by a strap 18 disposed in a vertical groove 19 in the wall of the battery casing to a terminal 20 in a recess in the bottom of the battery casing. The grooves in the battery casing walls may, if desired, be filled with a suitable sealing compound, so that the straps are thoroughly insulated.

The terminals 17 and 20 are adapted to rest upon springs 21 and 22 disposed in a separable cover 23 having lugs 24 and 25 adapted to engage similarly shaped recesses in the side walls of the battery. Thus the cover must always be disposed in a definite relation to the bottom of the battery and the springs will always make contact with the corresponding terminals in the bottom of the battery. The cover 23 may be made of hard rubber, bakelite, or other suitable insulating material, and may have connectors projecting from the side opposite the springs, to which conductors may be secured or may make contact for the purpose of completing an electric circuit as, for example, through an incandescent lamp in a portable lantern. When the battery as hereinbefore described is introduced to the lantern frame with the lugs registering properly as hereinbefore described, a connection with the positive and negative terminals of the battery will be made automatically, and the lantern will be ready for service. When the battery has been used for a period sufficient to deplete its energy, it may be removed and replaced by another unit which has been recharged. Meanwhile, the exhausted battery may be placed in a charging rack with connections similar to those employed in the lantern and may be recharged for further use.

The structure as described is simple and effective, facilitates the interchangeable use of battery units, and avoids the possibility of improper connections and short-circuits. In the normal use of the battery, as for example in a lantern, the gas vents in the top of the battery will be uppermost as they must be in order to permit the discharge of any gases which may form. The battery terminals are not, however, exposed to possible short-circuits. The terminals, being at the bottom and being disposed in recesses, cannot be short-circuited in any ordinary handling or use of the battery.

Various changes may be made in the details of form, construction and arrangement of the various parts, and the internal structure of the battery may be modified with respect to the form of the grids and the character of the material pasted thereon, and any suitable electrolyte, either with or without absorbent material, can be utilized in the battery, without departing from the invention or sacrificing any of the advantages thereof.

I claim:

A storage battery comprising a casing, positive and negative elements and an electrolyte therein, the casing having gas vents at its top and recesses in its bottom, terminals in the recesses connected respectively to the positive and negative elements, a separable cover for the bottom of the battery having connectors adapted to engage the terminals, and lugs adapted to engage corresponding recesses in the casing whereby the relative positions of the cover and casing are predetermined.

NORMAN D. STURGES.